United States Patent
Hattori

(10) Patent No.: US 10,234,668 B2
(45) Date of Patent: Mar. 19, 2019

(54) MICROSCOPE SYSTEM

(71) Applicant: OLYMPUS CORPORATION, Hachioji-shi, Tokyo (JP)

(72) Inventor: Toshiyuki Hattori, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 63 days.

(21) Appl. No.: 15/666,544

(22) Filed: Aug. 1, 2017

(65) Prior Publication Data

US 2018/0039054 A1 Feb. 8, 2018

(30) Foreign Application Priority Data

Aug. 4, 2016 (JP) .................. 2016-153304

(51) Int. Cl.
| | |
|---|---|
| G02B 21/00 | (2006.01) |
| G02B 21/36 | (2006.01) |
| G02B 21/24 | (2006.01) |
| G06T 7/00 | (2017.01) |

(52) U.S. Cl.
CPC ......... *G02B 21/008* (2013.01); *G02B 21/006* (2013.01); *G02B 21/0048* (2013.01); *G02B 21/241* (2013.01); *G02B 21/365* (2013.01); *G06T 7/00* (2013.01)

(58) Field of Classification Search
CPC ............. G02B 21/008; G02B 21/0048; G02B 21/006; G02B 21/365; G02B 21/241
See application file for complete search history.

(56) References Cited

U.S. PATENT DOCUMENTS

| | | | |
|---|---|---|---|
| 7,227,127 B2 | 6/2007 | Saggau et al. | |
| 7,676,071 B2 | 3/2010 | Widzgowski | |
| 8,730,582 B2 * | 5/2014 | Yokoi ............... | G02B 21/0032 359/279 |
| 9,432,592 B2 * | 8/2016 | Weida ............... | G02B 21/0056 |
| 9,823,451 B2 * | 11/2017 | Rowlette ............ | G02B 13/14 |
| 2001/0009763 A1 * | 7/2001 | Kambara ............ | B01J 19/0046 435/6.11 |
| 2007/0139753 A1 * | 6/2007 | Nakata ............... | G02B 21/0052 359/235 |
| 2016/0139389 A1 * | 5/2016 | Yuri ................... | G02B 21/16 348/79 |

OTHER PUBLICATIONS

Conceptual diagram of ETL (Electrically Tunable Lens), Retrieved from the Internet (URL: https://openi.nlm.nih.gov/detailedresult.php?img=PMC3130587_boe-2-7-2035-g001&req=4).

\* cited by examiner

*Primary Examiner* — Tsion B Owens
(74) *Attorney, Agent, or Firm* — Holtz, Holtz & Volek PC

(57) ABSTRACT

Provided is a microscope system including: a galvanometer scanner that scans laser light on a sample; an observation optical system that acquires an image of the sample on which the laser light is scanned by the galvanometer scanner; an ROI setting portion that sets a region-of-note, which is an area of note in the sample, so as to serve as an observation ROI in the image acquired by the observation optical system; an amount-of-rotation calculating portion that calculates an amount by which the observation ROI is rotated about the Z-axis in the image in association with rotation of the region-of-note about the Z-axis; and a control portion that controls the galvanometer scanner so that the direction in which the laser light is scanned in the region-of-note is made steady on the basis of the amount by which the observation ROI is rotated about the Z-axis.

12 Claims, 11 Drawing Sheets

US 10,234,668 B2

MICROSCOPE SYSTEM

CROSS-REFERENCE TO RELATED APPLICATIONS

This application claims the benefit of Japanese Patent Application No. 2016-153304, the content of which is incorporated herein by reference.

TECHNICAL FIELD

The present invention relates to a microscope system.

BACKGROUND ART

In the related art, there is a known microscope system with which an ROI (region-of-interest) is set in an image for a moving sample, and the sample is observed while tracking the sample (for example, see Patent Literature 1). With the laser microscope described in Patent Literature 1, a moving sample is tracked by resetting the ROI every time the sample moves in a three-dimensional manner in X-, Y-, and Z-directions.

CITATION LIST

Patent Literature

{PTL 1} Publication of U.S. Pat. No. 7676071 Specification

SUMMARY OF INVENTION

An aspect of the present invention is a microscope system including: a scanning optical system that scans laser light on a sample; an observation optical system that acquires an image of the sample on which the laser light is scanned by the scanning optical system; a region-of-interest setting portion that sets a region-of-note, which is an area of note in the sample, so as to serve as a region-of-interest in the image acquired by the observation optical system; an amount-of-rotation calculating portion that calculates an amount by which the region-of-interest is rotated about an observation optical axis in the image in association with rotation of the region-of-note about the observation optical axis of the observation optical system; and a control portion that controls the scanning optical system so that the direction in which the laser light is scanned in the region-of-note is made steady on the basis of the amount by which the region-of-interest is rotated about the observation optical axis, which is calculated by the amount-of-rotation calculating portion.

DESCRIPTION OF EMBODIMENTS

First Embodiment

A microscope system according to a first embodiment of the present invention will be described below with reference to the drawings.

Figure 1:
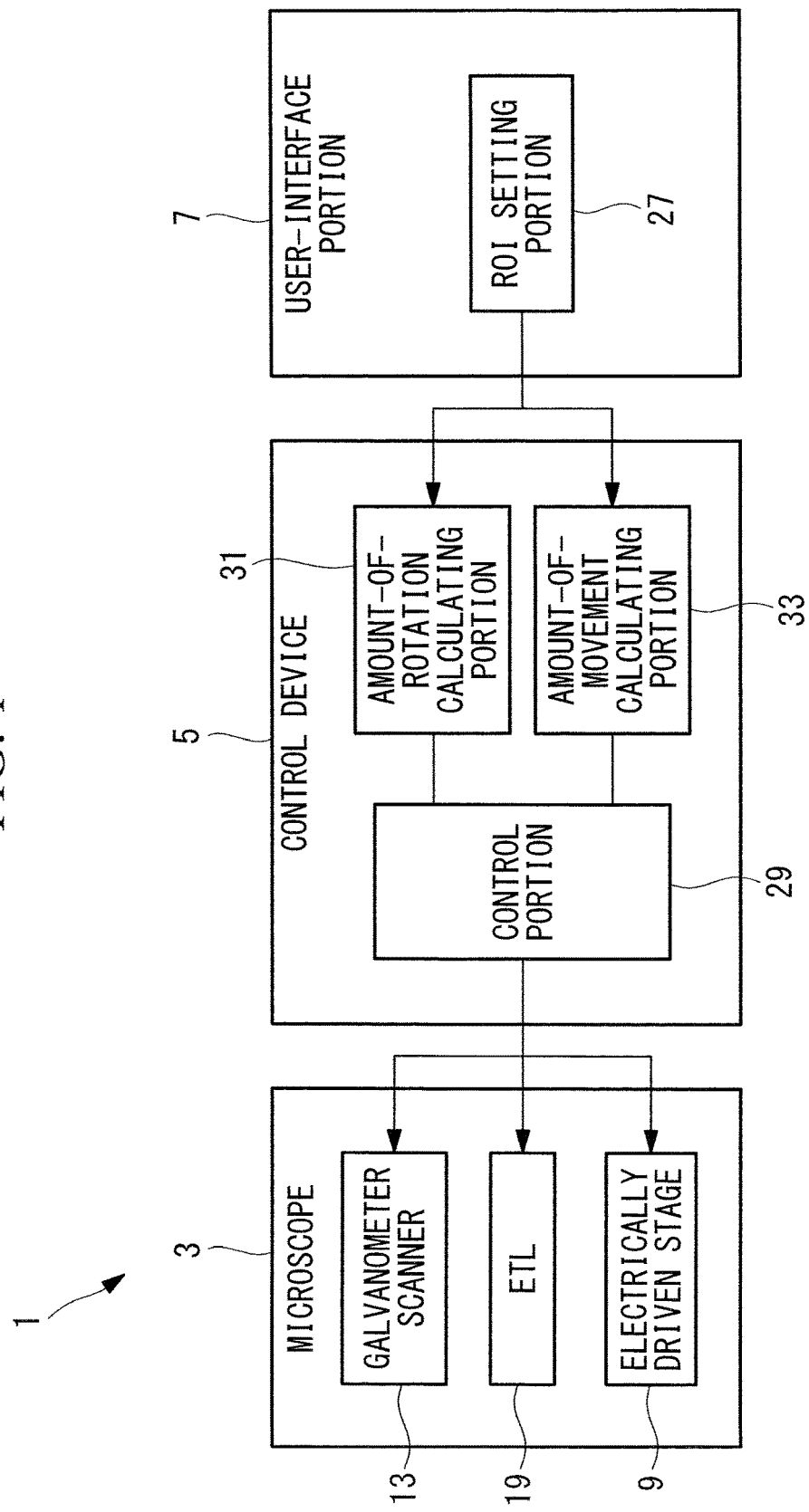
FIG. 1 is a block diagram showing a microscope system according to a first embodiment of the present invention.

As shown in FIG. 1, a microscope system 1 according to this embodiment is provided with: a microscope 3 for observing a sample; a control device 5 for controlling the microscope 3; and a user-interface portion 7 for inputting instructions from a user to the control device 5. In addition, input portions (not shown) such as a mouse, a keyboard, and so forth, with which the user inputs the instructions, are connected to the microscope system 1.

Figure 2:
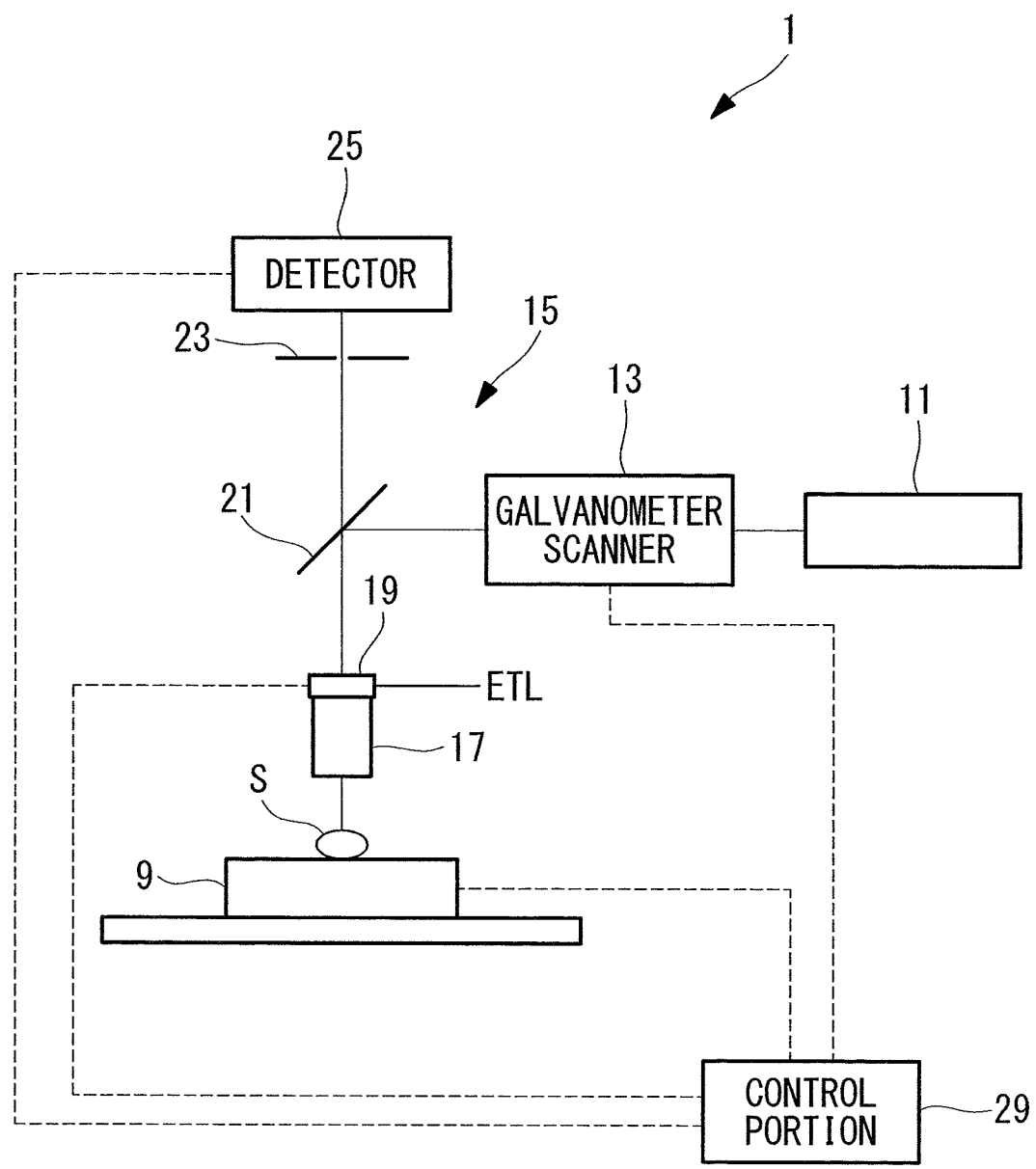
FIG. 2 is a diagram showing, in outline, the configuration of the microscope system according to the first embodiment of the present invention.

As shown in FIGS. 1 and 2, the microscope 3 is provided with: an electrically driven stage (scanning-area moving portion) 9 on which the sample S is placed; a light source 11 that generates laser light; a galvanometer scanner (scanning optical system) 13 that scans the laser light coming from the light source 11 on the sample S; and an observation optical system 15 that acquires an image of the sample S on which the laser light is scanned by the galvanometer scanner 13.

As the sample S, for example, a nematode or the like that moves in a three-dimensional manner and rotates about an optical axis of the observation optical system 15 will be described as an example.

The electrically driven stage 9 is provided with, for example, two motors (not shown), and can be horizontally moved, under the control of the control device 5, in X- and Y-directions along individual movement axes in the X- and Y-directions that are orthogonal to the optical axis of the observation optical system 15. By doing so, it is possible to move, in the X- and Y-directions, an area in which the laser light is scanned by the galvanometer scanner 13. In the following, the position of the area in which the laser light is scanned in the X- and Y-directions will be referred to as an XY-position.

The galvanometer scanner 13 is formed of two galvanometer mirrors that are provided so as to be pivotable, under the control of the control device 5, about pivoting axes that are orthogonal to each other. This galvanometer scanner 13 is configured so that, by deflecting the laser light in accordance with the pivoting angles, the laser light can be two-dimensionally scanned on the sample S in the X- and Y-directions. In addition, the two galvanometer mirrors are configured so that, by changing the patterns of changes in the respective pivoting angles in a synchronized manner, it is possible to change the direction in which the laser light is scanned.

As shown in FIG. 2, the observation optical system 15 is provided with: a plurality of objective lenses 17 that have different magnifications from each other, that radiate the laser light scanned by the galvanometer scanner 13 onto the sample S, and that, on the other hand, collect fluorescence generated in the sample S; an ETL (electrically tunable lens, focal-position moving portion) 19 with which the focal length of the observation optical system 15 can be changed; a dichroic mirror 21 that branches off the fluorescence that has passed through the ETL 19 from the optical path of the laser light; a pinhole 23 that restricts the passage of the fluorescence that has been branched off by the dichroic mirror 21; and a detector 25, such as a photomultiplier tube, that detects the fluorescence that has passed through the pinhole 23.

The ETL 19 is capable of, under the control of the control device 5, moving the focal position of the laser light in a direction along the optical axis of the observation optical system 15, that is, a Z-direction. In the following, the focal position of the laser light in the Z-direction will be referred to as the Z-position.

The dichroic mirror 21 reflects the laser light coming from the galvanometer scanner 13 toward the objective lens 17, and, on the other hand, the dichroic mirror 21 makes the fluorescence pass therethrough toward the pinhole 23 from the objective lens 17.

The pinhole 23 is configured so that only the fluorescence generated at the focal position of the objective lens 17 in the sample S can pass therethrough.

Figure 3:
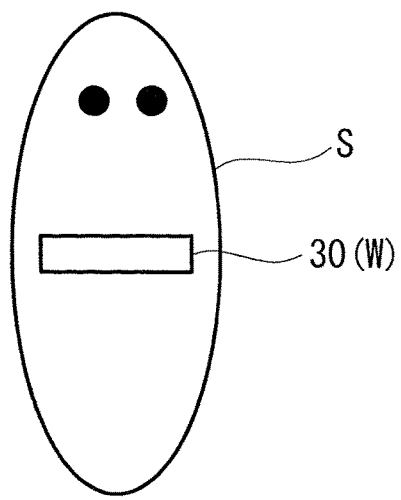
FIG. 3 is a plan view showing an example of an observation ROI set in a sample.

The user-interface portion 7 is, for example, a GUI (Graphical User Interface) of a PC (Personal Computer). As shown in FIG. 1, the user-interface portion 7 is provided with an ROI setting portion (region-of-interest setting portion) 27 that sets a region-of-note, which is a region-of-note in the sample S in an image acquired by using the microscope 3, so as to serve as an observation ROI (region-of-interest). The observation ROI may be set for the entire region in the sample S, or the observation ROI may be set for a portion of the region in the sample S. In the following, as shown in FIG. 3, the region-of-note in the sample S is indicated by reference sign W, and the observation ROI is indicated by reference sign 30.

The control device 5 is provided with: a PC (not shown); a memory (not shown) that stores various programs; and a control portion (computational processing device) 29 that loads and executes various programs stored in the memory, thus controlling the galvanometer scanner 13, the ETL 19, the electrically driven stage 9, the detector 25, and so forth.

The PC generates an image of the sample S on the basis of the luminance information of the fluorescence detected by the detector 25. In addition, the PC generates a three-dimensional image by combining a plurality of two-dimensional images whose focal positions in the sample S are different from each other.

In the following, with reference to FIG. 1, image analysis programs stored in the memory will be described as performed by an amount-of-rotation calculating portion 31 and an amount-of-movement calculating portion (first amount-of-movement calculating portion, second amount-of-movement calculating portion) 33.

When the region-of-note W in the sample S is rotated about the optical axis of the observation optical system 15, that is, the Z-axis, the amount-of-rotation calculating portion 31 calculates, by means of two-dimensional or three-dimensional image processing, the amount by which an observation ROI 30 is rotated about the Z-axis in the image in association with the rotation of the region-of-note W.

When the region-of-note W in the sample S is moved in the direction along the optical axis of the observation optical system 15, that is, the Z-direction, the amount-of-movement calculating portion 33 calculates, by means of two-dimensional or three-dimensional image processing, the amount by which the observation ROI 30 is moved in the Z-direction in the image in association with the movement of the region-of-note W. In addition, when the region-of-note W in the sample S is moved in the X- and Y-directions that intersect the Z-axis, the amount-of-movement calculating portion 33 calculates, by means of two-dimensional or three-dimensional image processing, the amounts by which the observation ROI 30 is moved in the X- and Y-directions in the image in association with the movements of the region-of-note W.

The control portion 29 loads the amount by which the observation ROI 30 is rotated about the Z-axis, which is calculated by the amount-of-rotation calculating portion 31, feeds back the information about the amount of rotation to the galvanometer scanner 13 so that the direction in which the laser light is scanned in the region-of-note W in the sample S is made steady, and adjusts, by changing the respective drive waveforms of the two galvanometer mirrors, the patterns of changes in the pivoting angles of the galvanometer mirrors in a synchronized manner.

In addition, when the region-of-note W in the sample S is moved in the Z-direction, the control portion 29 loads the amount by which the observation ROI 30 is moved in the Z-direction, which is calculated by the amount-of-movement calculating portion 33, feeds back the information about the amount of movement in the Z-direction to the ETL 19, and adjusts the focal position of the laser light in the Z-direction. The control portion 29 is configured so that the galvanometer scanner 13 and the ETL 19 can be controlled in a synchronized manner.

In addition, when the region-of-note W in the sample S is moved in the X- and Y-directions, the control portion 29 loads the amounts by which the observation ROI 30 is moved in the X- and Y-directions, which are calculated by the amount-of-movement calculating portion 33, feeds back the information about the amounts of movement in the X- and Y-directions to the electrically driven stage 9, and adjusts the position of the electrically driven stage 9 in the X- and Y-directions.

The operation of the thus-configured microscope system 1 will be described.

When observing a desired region-of-note in the sample S by using the microscope system 1 according to this embodiment, first, the sample S is placed on the electrically driven stage 9, and laser light is generated at the light source 11. The laser light emitted from the light source 11 is two-dimensionally scanned by the galvanometer scanner 13 in the X- and Y-directions, is reflected by the dichroic mirror 21, and is radiated onto the sample S by means of the objective lens 17 via the ETL 19.

Fluorescence generated in the sample S due to the irradiation with the laser light is collected by the objective lens 17, returns along the optical path of the laser light via the ETL 19, and is made to branch off from the optical path of the laser light by means of the dichroic mirror 21. Then, of the fluorescence branched off from the optical path of the laser light, only the fluorescence generated at the focal position of the objective lens 17 passes through the pinhole 23 and is detected by the detector 25. By doing so, the PC in the control device 5 generates a two-dimensional image (slice image) of the sample S on the basis of the luminance information of the fluorescence detected by the detector 25.

Next, the ETL 19 is controlled by the control portion 29, and the position at which the laser light is scanned by the galvanometer scanner 13 is finely moved in the Z-direction. Then, the laser light is scanned by the observation optical system 15 at the Z-position after the movement, and thus, a slice image of the sample S is acquired. In this way, the Z-positions are shifted stepwise in steps of fixed size at the same XY-position, and slice images are acquired at the respective Z-positions. Then, once the slice images at the respective Z-positions are acquired, these slice images are combined by the PC in the control device 5, and thus, a three-dimensional image of the sample S is generated.

Next, in the generated three-dimensional image of the sample S, the user specifies, via the input portions, a desired region-of-note W in the sample S he/she wants to observe. Once the region-of-note W in the sample S is specified, the ROI setting portion 27 sets the region-of-note W so as to serve as the observation ROI 30 in the image, as shown in FIG. 3.

By switching to the higher-magnification objective lens 17 and by performing time-lapse observation of the region-of-note W in the sample S in which the observation ROI 30 is set, the user can observe, in detail, changes over time of the region-of-note W in the sample S.

Figure 4:
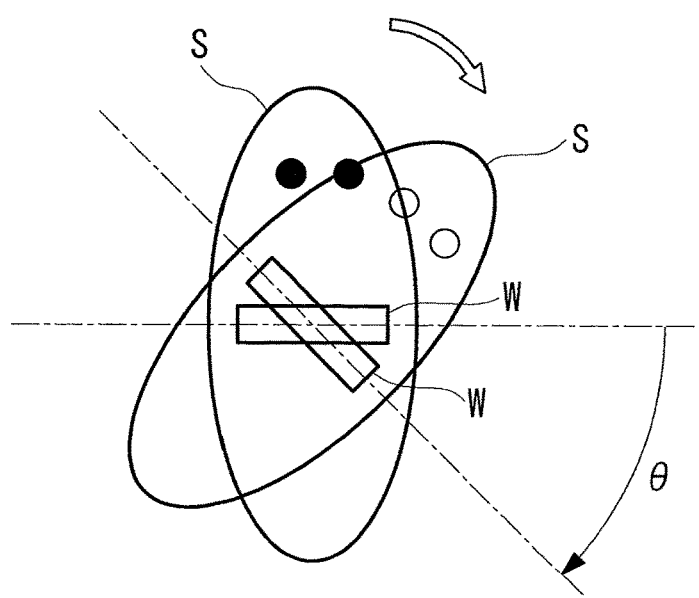
FIG. 4 is a plan view showing a manner in which a region-of-note in the sample is rotated about the Z-axis.
Figure 5:
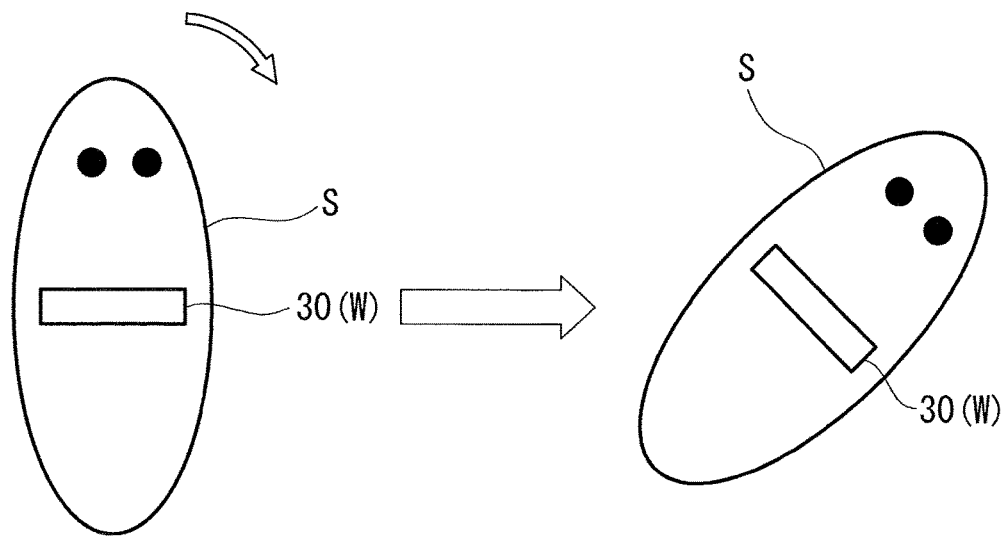
FIG. 5 is a plan view showing an example of a manner in which the observation ROI in the sample is moved in the image in the case in which a conventional microscope system, which serves as a reference example, is used.

Here, for example, when the region-of-note W in the sample S is rotated about the Z-axis, as shown in FIG. 4, with a conventional microscope system, the observation ROI 30 is also rotated in the image of the sample S in association with the rotation of that region-of-note W, as shown in FIG. 5. For example, when the region-of-note W in the sample S is continued to be rotated about the Z-axis during time-lapse observation, the orientation of the observation ROI 30 about the Z-axis is changed in each acquired slice image.

In contrast, with the microscope system 1 according to this embodiment, the amount-of-rotation calculating portion 31 processes the image of the rotated sample S acquired by the observation optical system 15, and a rotation amount (θ) by which the observation ROI 30 is rotated about the Z-axis in the image in association with rotation of the region-of-note W is calculated.

Figure 6:
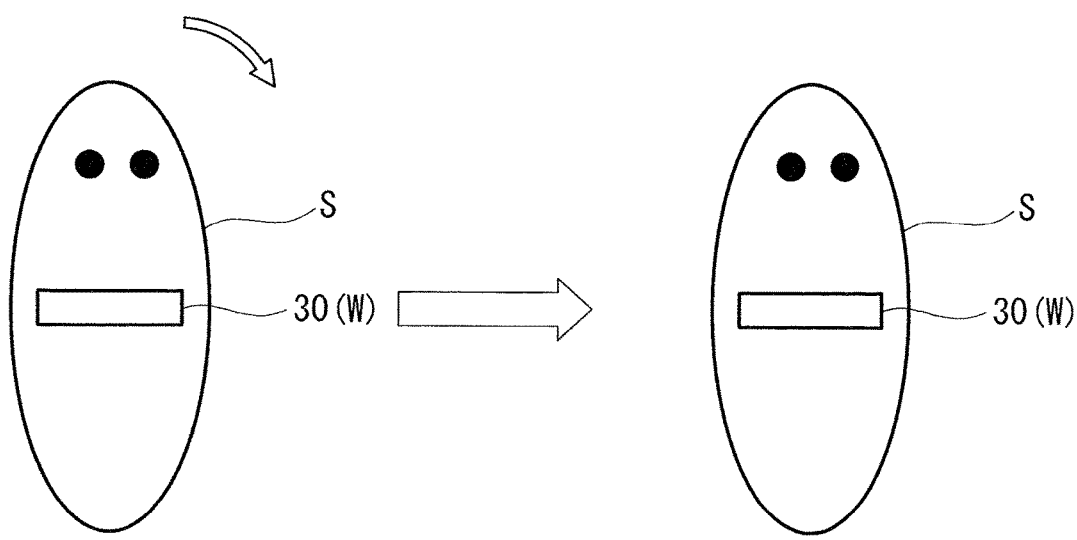
FIG. 6 is a plan view showing an example of a manner in which the observation ROI in the sample is moved in the image in the case in which the microscope system in FIGS. 1 and 2 is used.

Then, on the basis of the calculated rotation amount (θ) by which the observation ROI 30 is rotated, the control portion 29 feeds back the information about the amount of rotation to the galvanometer scanner 13 so that the direction in which the laser light is scanned in the region-of-note W in the sample S is made steady, and the patterns of changes in the respective pivoting angles of the two galvanometer mirrors are adjusted in a synchronized manner by an amount corresponding to the rotation amount 0. By doing so, it is possible to maintain, in real time, the apparent orientation of the observation ROI 30 in the sample S in the image to be steady, as shown in FIG. 6.

In addition, with this microscope system 1, when the region-of-note W in the sample S is moved in the Z-direction, the amount-of-movement calculating portion 33 processes the image of the moved sample S acquired by the observation optical system 15, and the amount by which the observation ROI 30 is moved in the Z-direction in the image in association with the movement of the region-of-note W is calculated.

Then, the control portion 29 feeds back the information about the amount by which the observation ROI 30 is moved in the Z-direction to the ETL 19, and the focal position of the laser light in the Z-direction is adjusted. By doing so, it is possible also to maintain, in real time, the position of the observation ROI 30 in the sample S in the Z-direction in the image to be steady.

In addition, when the region-of-note W in the sample S is moved in the X- and Y-directions, the amount-of-movement calculating portion 33 processes the image of the moved sample S acquired by the observation optical system 15, and the amounts by which the observation ROI 30 is moved in the X- and Y-directions in the image in association with the movement of that region-of-note W are calculated.

Then, the control portion 29 feeds back the information about the amounts by which the observation ROI 30 is moved in the X- and Y-directions to the electrically driven stage 9, and the position of the electrically driven stage 9 in the X- and Y-directions is adjusted. By doing so, the position of the observation ROI 30 in the sample S in the X- and Y-directions in the image can be maintained steady in real time.

As has been described above, with the microscope system 1 according to this embodiment, it is possible to observe the moving sample S by tracking the region-of-note W in the sample S while the apparent orientation of the observation ROI 30 in the image and the position thereof in the X-, Y-, and Z-directions are maintained steady, in real time, without having to standardize, after the fact, the apparent orientation of the observation ROI 30 in the image by means of image processing after acquiring all images.

In addition, by making the direction in which the laser light is scanned in the region-of-note W in the sample S steady and by adjusting the scanning position in the X- and Y-directions and the focal position in the Z-direction, it is possible to observe changes over time in the region-of-note W by fixing the apparent orientation and the position of the observation ROI 30 in the sample S in the image not only in the case in which the sample S as a whole moves in the same manner, but also in the case in which the region-of-note W in the sample S moves in a different manner as compared with other regions in the sample S.

Figure 7A:
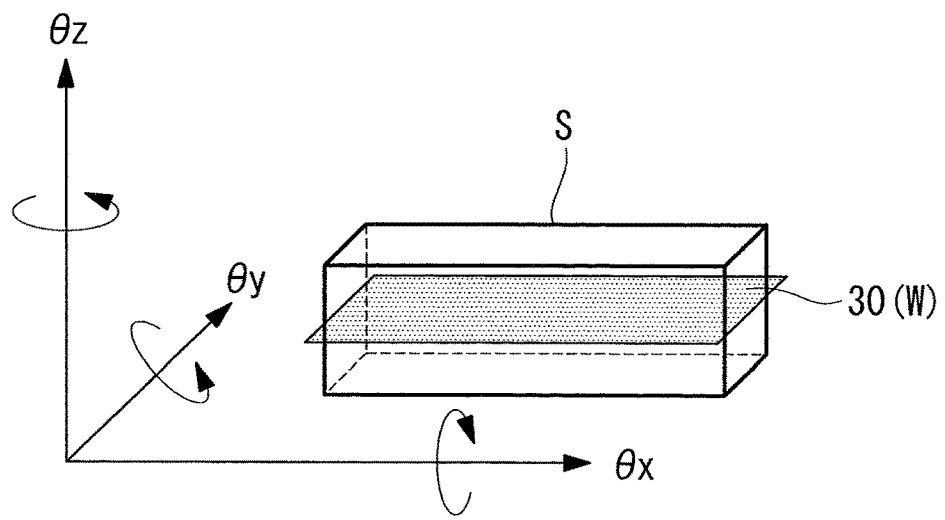
FIG. 7A is a projection view showing an example of a region-of-note in the sample.
Figure 7B:
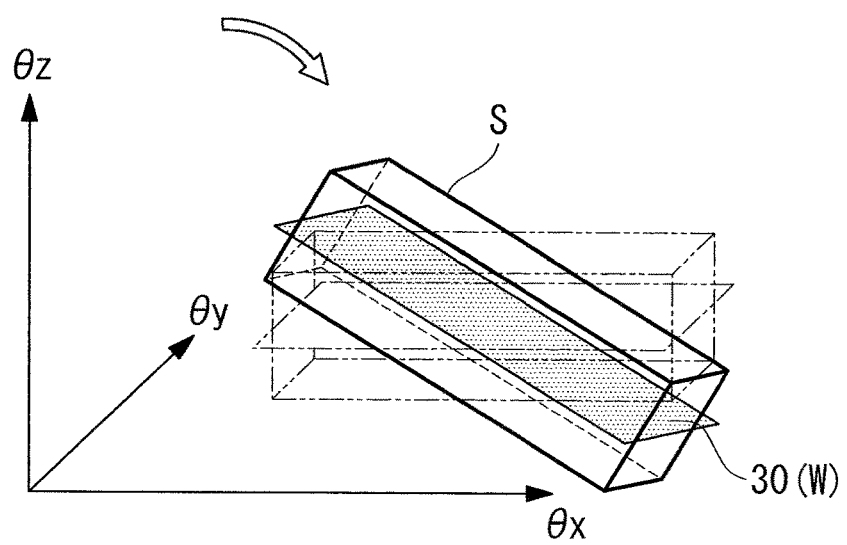
FIG. 7B is a projection view showing an example of a manner in which the region-of-note in FIG. 7A is rotated about the X-, Y-, and Z-axes.

In this embodiment, for example, when the region-of-note W in the sample S is rotated about the X-, Y-, and Z-axes, as shown in FIGS. 7A and 7B, the region-of-note W in the sample S may be tracked in a three-dimensional manner.

In this case, first, a plurality of slice images are acquired by means of the observation optical system 15 with respect to the normal vector of the flat region-of-note W in the sample S.

Then, the plurality of acquired slice images may be processed by the amount-of-movement calculating portion 33, thus calculating the amount by which the observation ROI 30 is moved in the X-, Y-, and Z-directions in the image in association with the movement of the region-of-note W, and the plurality of acquired slice images may be processed by the amount-of-rotation calculating portion 31, thus calculating the rotation amounts (θ) by which the observation ROI 30 is rotated about the X-, Y-, and Z-axes in the image in association with the rotation of the region-of-note W.

Then, on the basis of the calculated amount by which the observation ROI 30 is rotated about the Z-axis, the control portion 29 may feed back the information about the amount of rotation about the Z-axis to the galvanometer scanner 13 so that the direction in which the laser light is scanned in the region-of-note W in the sample S is made steady, and the patterns of changes in the respective pivoting angles of the two galvanometer mirrors may be adjusted in a synchronized manner.

In addition, on the basis of the calculated amounts by which the observation ROI 30 is rotated about the X- and Y-axes, the control portion 29 may feed back the information about the amount of rotation about the X- and Y-axes to the ETL 19, and the focal position of the laser light may be moved in the Z-direction in synchronization with scanning of the laser light by the galvanometer scanner 13. When the region-of-note W in the sample S is rotated about the X- and Y-axes, by moving the focal position of the laser light in the Z-direction by means of the ETL 19 in synchronization with scanning of the laser light by the galvanometer scanner 13 in the X- and Y-directions, it is possible to incline a surface scanned by the laser light in accordance with the inclinations of the region-of-note W about the X- and Y-axes.

When the region-of-note W in the sample S is moved in the X- and Y-directions, the control portion 29 may feed back the information about the amounts by which the observation ROI 30 is moved in the X- and Y-directions in the image to the electrically driven stage 9, and the position of the electrically driven stage 9 in the X- and Y-directions may be adjusted.

By doing so, even when the region-of-note W in the sample S is moved in one of the X-, Y-, and Z-directions or rotated about one of the X-, Y-, and Z-axes, the position of the observation ROI 30 in the sample S in the X-, Y-, and Z-directions in the image and the apparent orientation thereof about the X-, Y-, and Z-axes can be maintained steady in real time.

The image processing may be performed in the form of, for example, template matching or the like. In this case, the region-of-note W to be tracked may be stored, in advance, in a memory (not shown) as a template, the position at which the template is located in the three-dimensional space each time an image is captured may be searched by means of the amount-of-rotation calculating portion 31 and the amount-of-movement calculating portion 33, and thus, the amount by which the observation ROI 30 is moved in the X-, Y-, and Z-directions and the amount by which the observation ROI 30 is rotated about the X-, Y-, and Z-axes may be calculated. Note that, other processing methods may be employed to perform image processing.

In addition, although it is assumed in this embodiment that the region-of-note W in the sample S is set so as to serve as the observation ROI 30 and that the apparent orientation of the observation ROI 30 in the image and the position thereof in the X-, Y-, and Z-directions are maintained, in real time, to be steady, alternatively, a stimulation region (region-of-note) to be stimulated in the sample S may be set so as to serve as a stimulation ROI, and, in the same manner as the manner in which the observation ROI 30 is tracked, the orientation of the stimulation region about the Z-axis and the position thereof in the X-, Y-, and Z-directions may be maintained, in real time, to be steady. In this case, for example, a camera that acquires an image of the sample S may be employed as the observation optical system 15.

Second Embodiment

Next, a microscope system according to a second embodiment of the present invention will be described.

Figure 8:
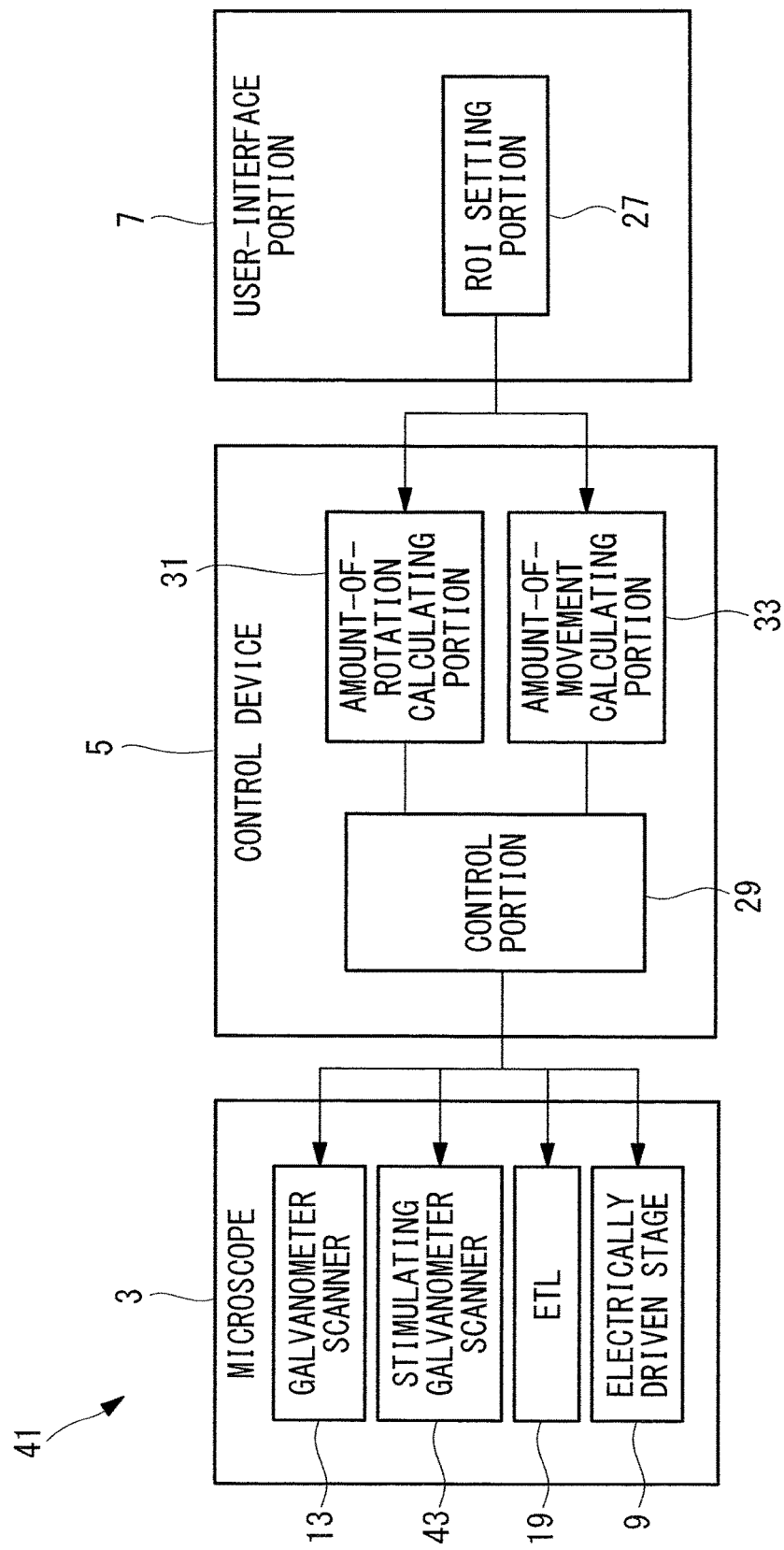
FIG. 8 is a block diagram showing a microscope system according to a second embodiment of the present invention.

As shown in FIG. 8, a microscope system 41 according to this embodiment differs from that of the first embodiment in that a stimulating galvanometer scanner (additional scanning optical system) 43 is provided in addition to the observation galvanometer scanner 13.

In the following, portions having common configurations with the microscope system 1 according to the first embodiment will be given the same reference signs, and descriptions thereof will be omitted.

The microscope system 41 according to this embodiment is configured so that stimulating laser light having a different wavelength from that of the observation laser light is scanned by the stimulating galvanometer scanner 43, and is radiated onto the sample S by means of the objective lens 17 in the observation optical system 15.

The stimulating galvanometer scanner 43 is formed of, for example, two galvanometer mirrors, as with the observation galvanometer scanner 13, and is configured so that the laser light coming from a stimulating light source can be scanned on the sample S in the X- and Y-directions. In addition, the two galvanometer mirrors are configured so that, by changing the patterns of changes in the respective pivoting angles thereof in a synchronized manner, it is possible to change the direction in which the laser light is scanned.

Figure 9A:
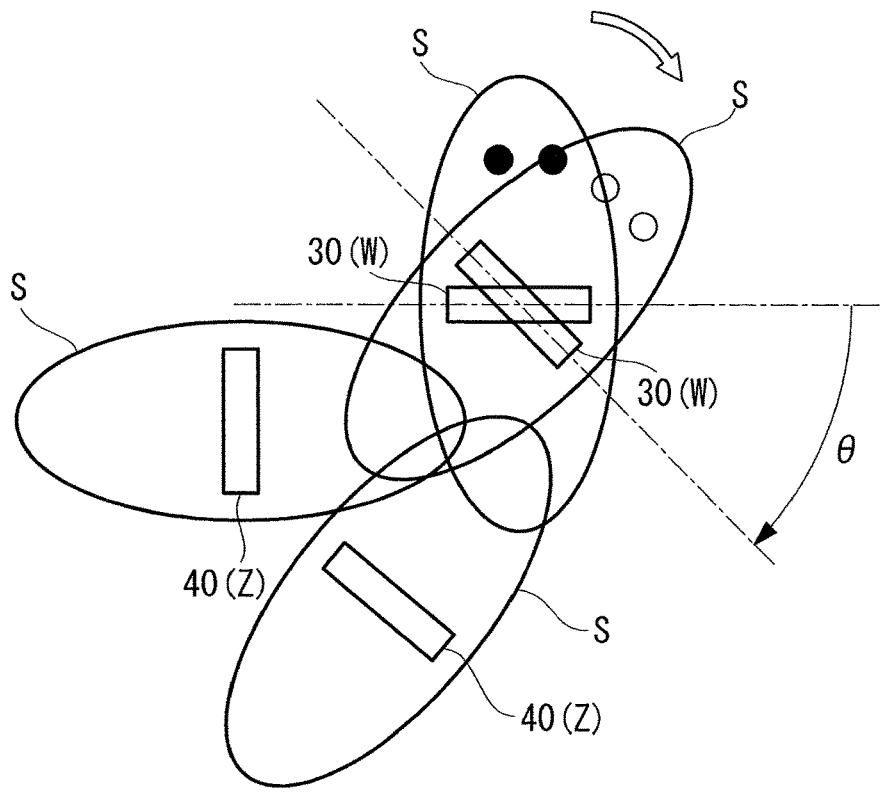
FIG. 9A is a projection view showing an example of a stimulation ROI in the sample in the image.

In the image of the sample S acquired by means of the observation optical system 15, as shown in FIG. 9A, the ROI setting portion 27 sets a stimulation region (additional region-of-note) Z to be stimulated in the sample S so as to serve as a stimulation ROI (additional region-of-interest) 40.

When the stimulation region Z in the sample S is rotated about the Z-axis, the amount-of-rotation calculating portion 31 calculates, by means of two-dimensional or three-dimensional image processing, the amount by which the stimulation ROI 40 is rotated about the Z-axis in the image in association with the rotation of the stimulation region Z. The calculation of the amount by which the stimulation ROI 40 is rotated, which is performed by the amount-of-rotation calculating portion 31, is separately performed independently of the calculation of the amount by which the observation ROI 30 is rotated.

When the stimulation region Z in the sample S is moved in the Z-direction, the amount-of-movement calculating portion 33 (first amount-of-movement calculating portion, second amount-of-movement calculating portion, additional first amount-of-movement calculating portion, additional second amount-of-movement calculating portion) calculates, by means of two-dimensional or three-dimensional image processing, the amount by which the stimulation ROI 40 is moved in the Z-direction in the image in association with the movement of the stimulation region Z.

In addition, when the stimulation region Z in the sample S is moved in the X- and Y-directions, the amount-of-movement calculating portion 33 calculates, by means of two-dimensional or three-dimensional image processing, the amounts by which the stimulation ROI 40 is moved in the X- and Y-directions in the image in association with the movements of the stimulation region Z. The calculations of these amounts by which the stimulation ROI 40 is moved, which are performed by the amount-of-movement calculating portions 33, are separately performed independently of the calculations of the amounts by which the observation ROI 30 is moved.

The control portion 29 loads the amount by which the stimulation ROI 40 is rotated about the Z-axis, which is calculated by the amount-of-rotation calculating portion 31, feeds back the information about the amount of rotation to the stimulating galvanometer scanner 43 so that the direction in which the laser light is scanned in the stimulation region Z in the sample S is made steady, and adjusts, by changing the respective drive waveforms of the two galvanometer mirrors, the patterns of changes in the pivoting angles of the galvanometer mirrors in a synchronized manner.

In addition, when the stimulation region Z in the sample S is moved in the Z-direction, the control portion 29 loads the amount by which the stimulation ROI 40 is moved in the Z-direction, which is calculated by the amount-of-movement calculating portion 33, feeds back the information about the amount of movement in the Z-direction to the ETL (focal-position moving portion, additional focal-position moving portion) 19, and adjusts the focal position of the laser light in the Z-direction. The control portion 29 is configured so that the stimulating galvanometer scanner 43 and the ETL 19 can be controlled in a synchronized manner.

In addition, when the stimulation region Z in the sample S is moved in the X- and Y-directions, the control portion 29 loads the amounts by which the stimulation ROI 40 is moved in the X- and Y-directions, which are calculated by the amount-of-movement calculating portion 33, feeds back the information about the amounts of the movement in the X- and Y-directions to the electrically driven stage 9, and adjusts the position of the electrically driven stage (scanning-area moving portion, additional scanning-area moving portion) 9 in the X- and Y-directions.

The operation of the thus-configured microscope system 41 will be described.

When observing a reaction of the sample S to light stimulation by using the microscope system 41 according to this embodiment, first, a three-dimensional image of the samples is acquired by using the same method as that of the first embodiment, and the observation ROI 30 is set.

Next, in the generated three-dimensional image of the sample S, the user specifies, via the input portions, a desired stimulation region Z in the sample S he/she wants to stimulate. Once the stimulation region Z in the sample S is specified, the ROI setting portion 27 sets the stimulation region Z so as to serve as the stimulation ROI 40 in the image.

By radiating the stimulating laser light onto the stimulation region Z by means of the stimulating galvanometer scanner 43 and by radiating the observation laser light onto the region-of-note W by means of the observation optical system 15, thus acquiring an image of the region-of-note W, the user can observe the reaction of the region-of-note W in the sample S to the light stimulation.

Figure 9B:
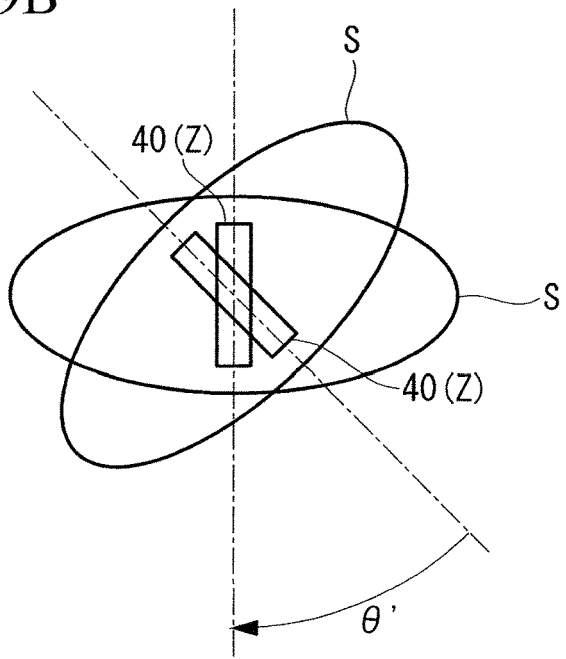
FIG. 9B is a projection view showing an example of a manner in which a stimulation region in the sample is rotated about the Z-axis.

Here, for example, when the stimulation region Z in the sample S is rotated about the Z-axis, as shown in FIG. 9B, the amount-of-rotation calculating portion 31 processes the image of the rotated sample S acquired by the observation optical system 15, and a rotation amount (θ') by which the stimulation ROI 40 is rotated about the Z-axis in the image in association with rotation of the stimulation region Z is calculated.

Then, on the basis of the calculated rotation amount (θ') by which the stimulation ROI 40 is rotated, the control portion 29 feeds back the information about the amount of rotation to the stimulating galvanometer scanner 43 so that the direction in which the laser light is scanned in the stimulation region Z in the sample S is made steady, and the patterns of changes in the respective pivoting angles of the two galvanometer mirrors are adjusted in a synchronized manner by an amount corresponding to the rotation amount (θ'). By doing so, the apparent orientation of the stimulation ROI 40 in the sample S in the image can be maintained steady in real time.

In addition, when the stimulation region Z in the sample S is moved in the Z-direction, the amount-of-movement calculating portion 33 processes the image of the moved sample S acquired by the observation optical system 15, and the amount by which the stimulation ROI 40 is moved in the Z-direction in the image in association with the movement of the stimulation region Z is calculated.

Then, the control portion 29 feeds back the information about the amount by which the stimulation ROI 40 is moved in the Z-direction to the ETL 19, and the focal position of the laser light in the Z-direction is adjusted. By doing so, the position of the stimulation ROI 40 in the sample S in the Z-direction in the image can also be maintained steady in real time.

In addition, when the stimulation region Z in the sample S is moved in the X- and Y-directions, the amount-of-movement calculating portion 33 processes the image of the moved sample S acquired by the observation optical system 15, and the amounts by which the stimulation ROI 40 is moved in the X- and Y-directions in the image in association with the movement of the stimulation region Z are calculated.

Then, the control portion 29 feeds back the information about the amounts by which the stimulation ROI 40 is moved in the X- and Y-directions to the electrically driven stage 9, and the position of the electrically driven stage 9 in the X- and Y-directions is adjusted. By doing so, the position of the stimulation ROI 40 in the sample S in the X- and Y-directions in the image can be maintained steady in real time.

As has been described above, with the microscope system 41 according to this embodiment, it is possible to observe the reaction of the moving sample S to the light stimulation by tracking the sample S, while maintaining, in real time, the apparent orientation of the stimulation ROI 40 in the image and the position thereof in the X-, Y-, and Z-directions to be steady. In addition, by making the direction in which the laser light is scanned in the stimulation region Z in the sample S steady and by adjusting the scanning position in the X- and Y-directions and the focal position in the Z-direction, it is possible to perform light stimulation in the stimulation region Z by fixing the orientation and position of the stimulation ROI 40 in the sample S also in the case in which the stimulation region Z in the sample S moves in a different manner as compared with other regions in the sample S.

Figure 10A:
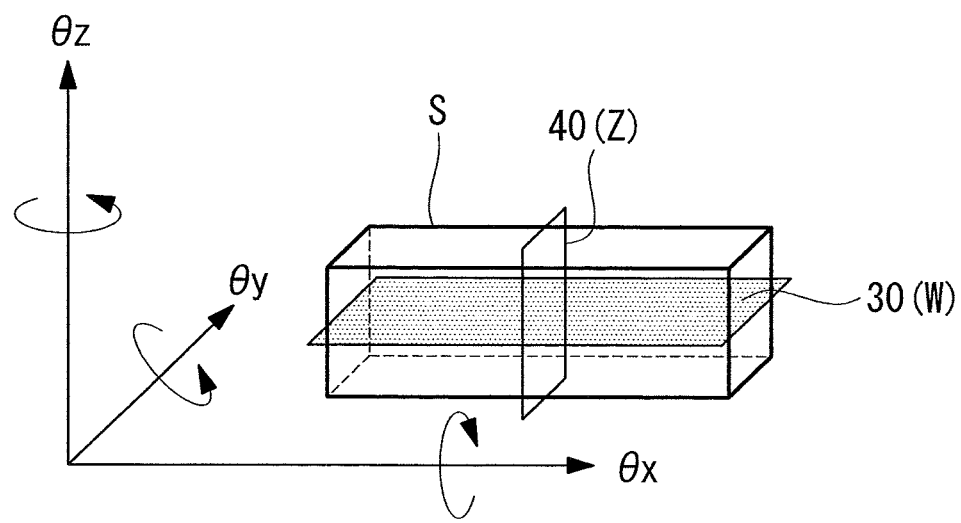
FIG. 10A is a projection view showing an example of a stimulation region in the sample.
Figure 10B:
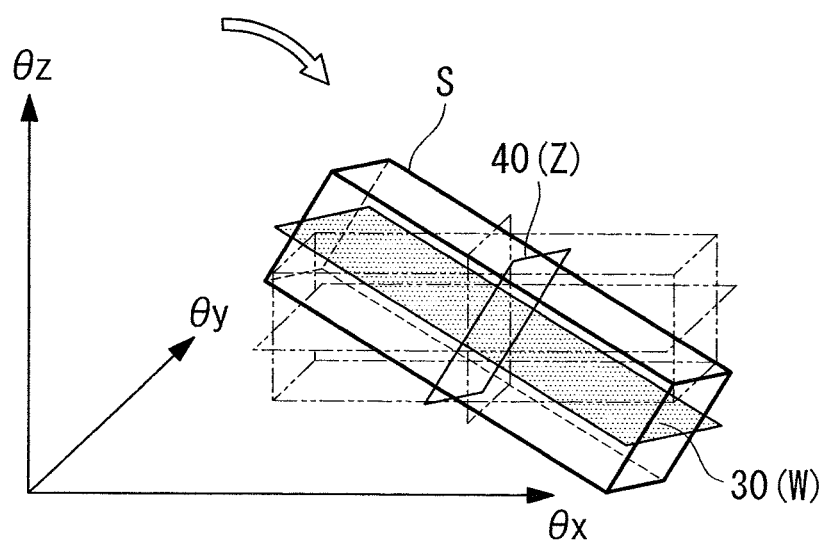
FIG. 10B is a projection view showing an example of a manner in which the stimulation region in FIG. 10A is rotated about the X-, Y-, and Z-axes.

In this embodiment also, for example, when the stimulation region Z in the samples is rotated about the X-, Y-, and Z-axes, as shown in FIGS. 10A and 10B, the stimulation region Z in the sample S may be tracked in a three-dimensional manner.

In this case, as with the case of the region-of-note W, a plurality of slice images may be acquired by means of the observation optical system 15 with respect to the normal vector of the flat stimulation region Z in the sample S, and the plurality of acquired slice images may be processed by the amount-of-movement calculating portion 33 and the amount-of-rotation calculating portion 31, thus calculating the amounts by which the stimulation ROI 40 is moved in the X-, Y-, and Z-directions and the rotation amounts (θ) by which the stimulation ROI 40 is rotated about the X-, Y-, and Z-axes.

Then, on the basis of the calculated amount by which the stimulation ROI 40 is rotated about the Z-axis, the control portion 29 may feed back the information about the amount of rotation about the Z-axis to the additional galvanometer scanner 43 so that the direction in which the laser light is scanned in the stimulation region Z in the sample S is made steady, and the patterns of changes in the respective pivoting angles of the two galvanometer mirrors may be adjusted in a synchronized manner.

In addition, on the basis of the calculated amounts by which the observation ROI 30 is rotated about the X- and Y-axes, the control portion 29 may feed back the information about the amount of rotation about the X-, and Y-axes to the ETL 19, and the focal position of the laser light may be moved in the Z-direction in synchronization with scanning of the laser light by the additional galvanometer scanner 43. When the stimulation region Z in the sample S is rotated about the X- and Y-axes, by moving the focal position of the laser light by the ETL 19 in the Z-direction in synchronization with scanning of the laser light by the additional galvanometer scanner 43 in the X- and Y-directions, it is possible to incline a surface scanned by the laser light in accordance with the inclinations of the stimulation region Z about the X- and Y-axes.

When the stimulation region Z in the sample S is moved in the X- and Y-directions, the control portion 29 may feed back the information about the amounts by which the stimulation ROI 40 is moved in the X- and Y-directions in the image to the electrically driven stage 9, and the position of the electrically driven stage 9 in the X- and Y-directions may be adjusted.

By doing so, even when the stimulation region Z in the sample S is moved in one of the X-, Y-, and Z-directions or rotated about one of the X-, Y-, and Z-axes, it is possible to observe the reaction to the light stimulation by tracking the sample S while the position of the stimulation ROI 40 in the sample S in the X-, Y-, and Z-directions in the image and the apparent orientation thereof about the X-, Y-, and Z-axes are maintained steady in real time.

The individual embodiments described above can be modified as follows.

In the individual embodiments, described above, although the galvanometer scanners 13 and 43 have been described as examples of the scanning optical system and the additional scanning optical system, respectively, as a first modification, for example, two AODs (Acousto-Optic Deflectors, not shown) each may be employed as the scanning optical system and the additional scanning optical system. With the AODs, it is possible to scan laser light by diffracting the laser light by propagating ultrasonic waves in crystals.

In this case, the two AODs may be disposed so as to be orthogonal to each other, the respective AODs may be controlled by the control portion 29, and thus, the laser light may be two-dimensionally scanned on the sample S in the X- and Y-directions. In addition, on the basis of the amounts of rotation of the observation ROI 30 and the stimulation ROI 40 calculated by the amount-of-rotation calculating portion 31, the control portion 29 may perform feedback to the respective AODs so that the directions in which the laser light is scanned in the region-of-note W and the stimulation region Z in the sample S are made steady, and thus, the directions in which the laser light is scanned may be adjusted.

Figure 11:
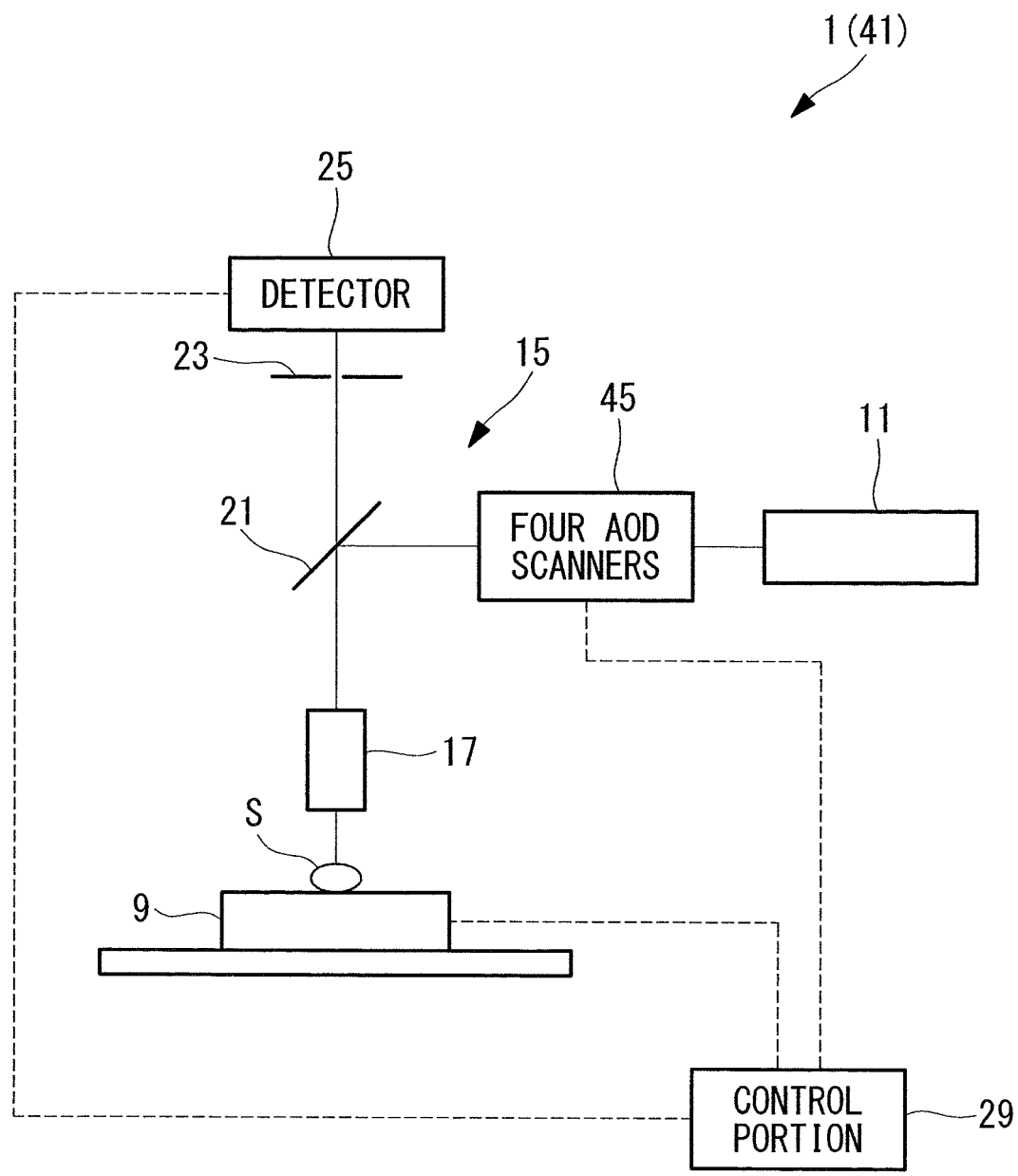
FIG. 11 is a diagram showing, in outline, the configuration of a microscope system according to a second modification of the first and second embodiments of the present invention.

In addition, in the individual embodiments, described above, although the ETL 19 is employed as the focal-position moving portion, as a second modification, for example, four AODs 45 may be employed so as to serve as the scanning optical system and the focal-position moving portion, as shown in FIG. 11.

Figure 12:
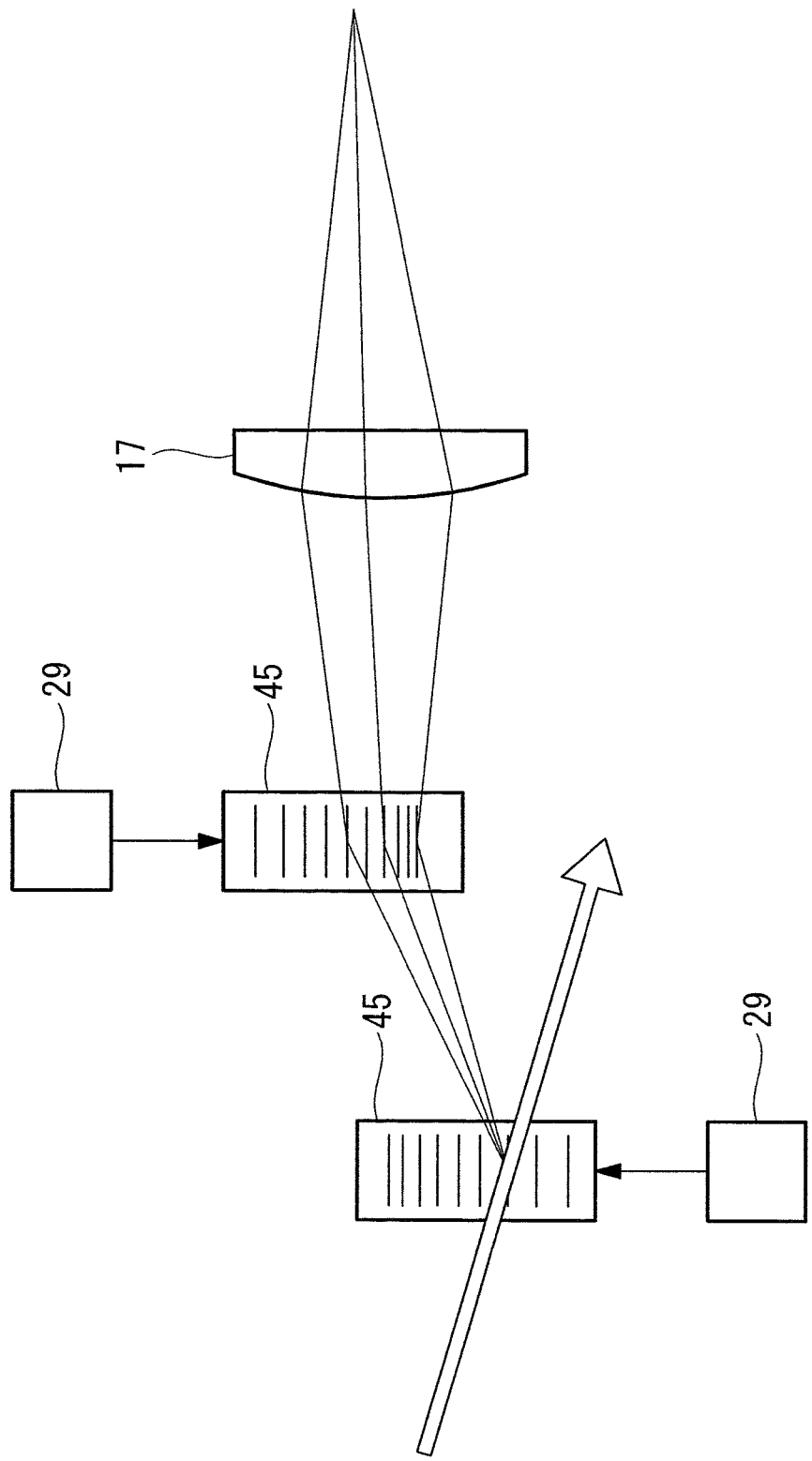
FIG. 12 is a diagram showing an example of an arrangement of AODs in FIG. 11.

In this case, for example, as shown in FIG. 12, XY-scanning may be performed by inputting, by means of the control portion 29, chirp signals of opposing directions to the two AODs 45 that form a pair. In addition, the two AODs 45 that form a pair may be disposed so as to be orthogonal to each other; on the basis of the amount by which the observation ROI 30 is rotated, which is calculated by the amount-of-rotation calculating portion 31, the control portion 29 may perform feedback to the respective AODs 45 so that the direction in which the laser light is scanned in the region-of-note W in the sample S is made steady, and thus, the direction in which the laser light is scanned may be adjusted.

In addition, the control portion 29 may load the amount by which the observation ROI 30 is moved in the Z-direction, which is calculated by the amount-of-movement calculating portion 33, may perform feedback to the respective AODs 45, and may adjust the focal position of the laser light in the Z-direction.

In this modification, as with the scanning optical system and the focal-position moving portion, four AODs may be employed so as to serve as the additional scanning optical system and the additional focal-position moving portion.

In this case, for example, when the region-of-note W and the stimulation region Z in the sample S are rotated about the X- and Y-axes, the amounts by which the observation ROI 30 and the stimulation ROI 40 are rotated about the X- and Y-axes in association with the rotations of the region-of-note W and the stimulation region Z about the X- and Y-axes may be calculated by the amount-of-rotation calculating portion 31. Then, on the basis of the calculated amounts by which the observation ROI 30 and the stimulation ROI 40 are rotated about the X- and Y-axes, the control portion 29 may feed back the information about the amounts of rotation about the X- and Y-axes to the AODs, and the focal position of the laser light may be moved in the Z-direction while scanning the laser light in the X- and Y-directions by means of the AODs.

By doing so, it is possible to perform observation and stimulation by tracking the sample S while maintaining, in real time, the apparent orientations and the inclinations about the X- and Y-axes of the observation ROI 30 and the stimulation ROI 40 in the three-dimensional image to be steady by inclining the surface scanned by the laser light in accordance with the inclinations of the region-of-note W and the stimulation region Z in the sample S about the X- and Y-axes.

Figure 13:
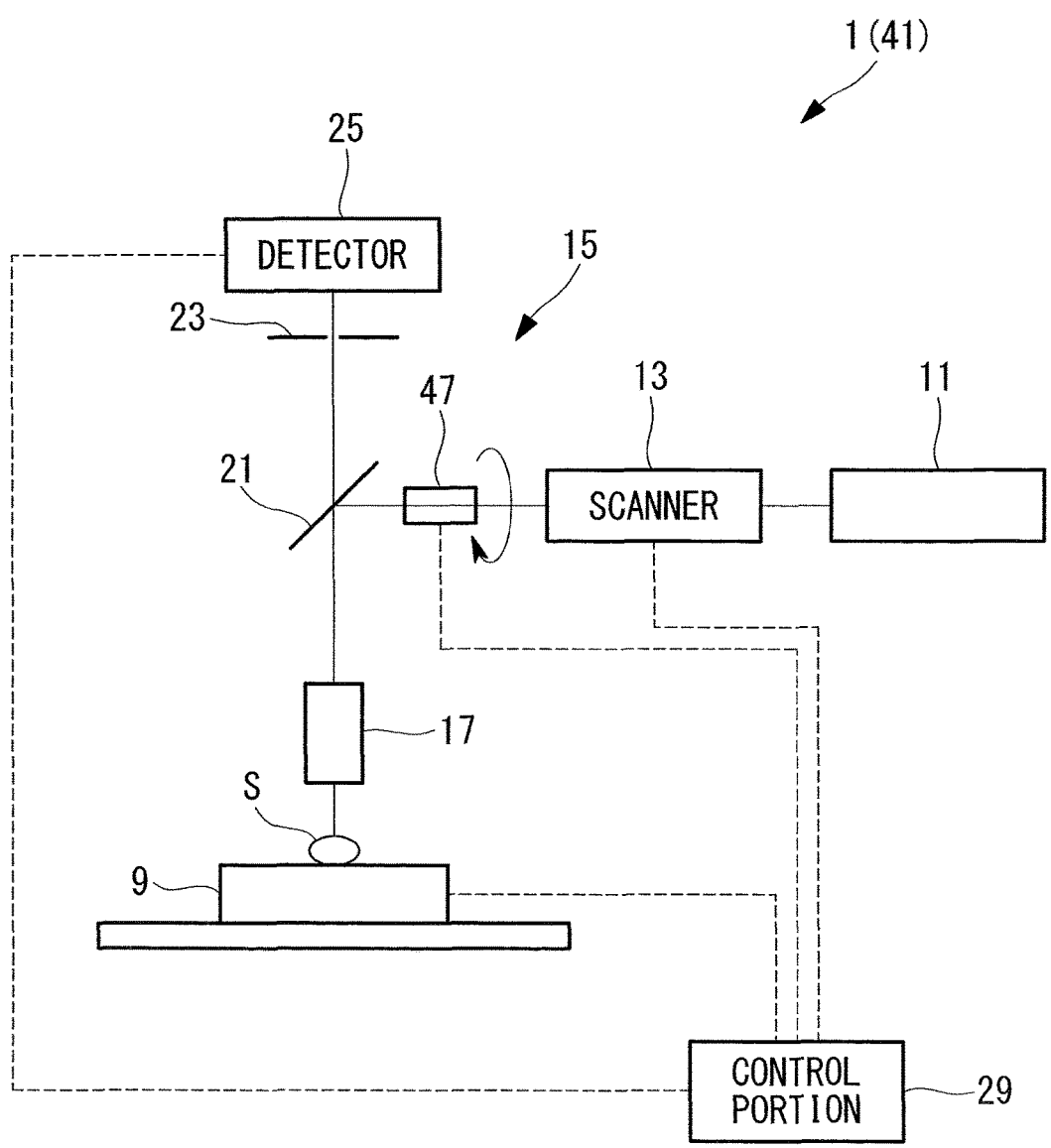
FIG. 13 is a diagram showing, in outline, the configuration of a microscope system according to a third modification of the first and second embodiments of the present invention.

In addition, in the individual embodiments, described above, although the patterns of changes in the respective pivoting angles of the two galvanometer mirrors of the galvanometer scanner 13 are adjusted in a synchronized manner, as a third modification, for example, as shown in FIG. 13, an image rotor 47 may be disposed in the optical path between the galvanometer scanner 13 and the dichroic mirror 21, and the direction in which the laser light is scanned may be changed by means of the image rotor 47. In this case, for example, in this modification, a resonant scanner with which rotation scan cannot be performed may be employed as the scanning optical system, instead of the galvanometer scanner 13.

In this modification, as with the galvanometer scanner 13, an image rotor that changes the direction in which the laser light is scanned by the additional galvanometer scanner 43 may be employed. In this case, a resonant scanner may be employed instead of the additional galvanometer scanner 43.

In addition, in the individual embodiments, described above, although the ETL 19 has been described as an example of the focal-position moving portion and the additional focal-position moving portion, alternatively, a revolver that can finely move the objective lens 17 in the Z-direction may be employed. In this case, by means of control performed by the control portion 29, the position at which the laser light is scanned by means of the observation optical system 15 may be moved in the Z-direction by finely moving the objective lens 17 held by the revolver in the Z-direction.

As above, although the embodiments of the present invention have been described in detail with reference to the drawings, specific configurations are not limited to these embodiments, and design alterations or the like within a scope that does not depart from the scope of the present invention are also encompassed. For example, the present invention is not limited to the forms applied to the individual embodiments and modifications, described above, and the present invention may be applied to embodiments in which these embodiments and modifications are appropriately combined, and it is not particularly limited. In addition, although a single amount-of-movement calculating portion 33 has been described as an example of the first amount-of-movement calculating portion, the second amount-of-movement calculating portion, the additional first amount-of-movement calculating portion, and the additional second amount-of-movement calculating portion, separate, independent amount-of-movement calculating portions may be employed so as to serve as the respective amount-of-movement calculating portions.

In addition, in the individual embodiments, described above, although examples in which, in the case in which the sample S is observed in a three-dimensional manner, the orientations about the Z-axis, the positions in the X-, Y-, and Z-directions, or the like of the observation ROI 30 and the stimulation ROI 40 in the three-dimensional image are maintained to be steady have been described, in the case in which the sample S for which movement in the Z-direction and rotation about the X- and Y-axes do not occur is observed or stimulated in a two-dimensional manner, it is not necessary to acquire observation images at a plurality of focal positions to calculate the amount of rotation, and the orientations of the observation ROI 30 and the stimulation ROI 40 about the Z-axis may be calculated by the amount-of-rotation calculating portion 31 by using a two-dimensional image acquired at a single focal position corresponding to the observation surface.

The following invention is derived from the above embodiments.

An aspect of the present invention is a microscope system including: a scanning optical system that scans laser light on a sample; an observation optical system that acquires an image of the sample on which the laser light is scanned by the scanning optical system; a region-of-interest setting portion that sets a region-of-note, which is an area of note in the sample, so as to serve as a region-of-interest in the image acquired by the observation optical system; an amount-of-rotation calculating portion that calculates an amount by which the region-of-interest is rotated about an observation optical axis in the image in association with rotation of the region-of-note about the observation optical axis of the observation optical system; and a control portion that controls the scanning optical system so that the direction in which the laser light is scanned in the region-of-note is made steady on the basis of the amount by which the region-of-interest is rotated about the observation optical axis, which is calculated by the amount-of-rotation calculating portion.

With this aspect, when the laser light is scanned by the scanning optical system and an image of the sample is acquired by means of the observation optical system, the region-of-interest setting portion sets a region-of-note in the sample so as to serve as a region-of-interest in the image. In this case, when the region-of-note in the sample in which the region-of-interest is set is rotated about the observation optical axis, the region-of-interest is also rotated in the image in association with the rotation of the region-of-note.

Therefore, by controlling the scanning optical system by means of the control portion on the basis of the amount by which the region-of-interest is rotated about the observation optical axis, which is calculated by the amount-of-rotation calculating portion, it is possible to make the direction in which the laser light is scanned in the region-of-note in the sample steady. By doing so, it is possible to observe a moving sample by tracking the sample while the apparent orientation of the region-of-interest in the image is maintained steady in real time without having to standardize, after the fact, the apparent orientation of the region-of-interest in the image by means of image processing.

The above-described aspect may be provided with a focal-position moving portion that can move a focal position of the laser light in a direction along the observation optical axis; and a first amount-of-movement calculating portion that calculates an amount by which the region-of-interest is moved in the direction along the observation optical axis in the image in association with movement of the region-of-note in the direction along the observation optical axis, wherein the control portion causes the focal-position moving portion to move the focal position in the direction along the observation optical axis on the basis of the amount by which the region-of-interest is moved in the direction along the observation optical axis, which is calculated by the first amount-of-movement calculating portion.

By employing such a configuration, it is possible to acquire a three-dimensional image of the sample by means of the observation optical system by moving, by means of the focal-position moving portion, the focal position of the laser light in the direction along the observation optical axis with respect to the sample. In this case, when the region-of-note in the sample in which the region-of-interest is set is rotated about the observation optical axis and moved in the direction along the observation optical axis, the region-of-interest is rotated and moved in the image in association with the rotation and the movement of the region-of-note.

Therefore, by causing the focal-position moving portion to move the focal position of the laser light in the direction along the observation optical axis by means of the control portion on the basis of the amount by which the region-of-interest is moved in the direction along the observation optical axis, which is calculated by the first amount-of-movement calculating portion, it is possible to observe a moving sample by tracking the sample while the apparent orientation of the region-of-interest in the three-dimensional image and the position thereof in the direction along the observation optical axis are maintained steady in real time.

In the above-described aspect, with respect to rotation of the region-of-interest associated with rotation of the region-of-note about an intersecting axis that intersects the observation optical axis, the amount-of-rotation calculating portion may calculate an amount by which the region-of-interest is rotated about the intersecting axis in the image, and the control portion may cause the focal-position moving portion to move, in synchronization with scanning of the laser light by the scanning optical system, the focal position in the direction along the observation optical axis on the basis of the amount by which the region-of-interest is rotated about the intersecting axis, which is calculated by the amount-of-rotation calculating portion.

By employing such a configuration, when the region-of-note in the sample is rotated about the intersecting axis that intersects the observation optical axis, it is possible to incline a surface scanned by the laser light in accordance with the inclination of the region-of-note about the intersecting axis. By doing so, it is possible to observe a moving sample by tracking the sample while the apparent orientation of the region-of-interest in the three-dimensional image and the inclination thereof about the intersecting axis are maintained steady in real time.

The above-described aspect may be provided with a first amount-of-movement calculating portion that calculates an amount by which the region-of-interest is moved in a direction along the observation optical axis in the image in association with the movement of the region-of-note in the direction along the observation optical axis, wherein the control portion may cause the scanning optical system to move the focal position of the laser light in the direction along the observation optical axis on the basis of the amount by which the region-of-interest is moved in the direction along the observation optical axis, which is calculated by the first amount-of-movement calculating portion.

By employing such a configuration, it is possible to acquire a three-dimensional image of the sample by means of the observation optical system by moving the focal position of the laser light in the direction along the observation optical axis while scanning, by means of the scanning optical system, the laser light in a direction that intersects the observation optical axis with respect to the sample. In this case, when the region-of-note in the sample in which the region-of-interest is set is rotated about the observation optical axis and moved in the direction along the observation optical axis, the region-of-interest is rotated and moved in the image in association with the rotation and the movement of the region-of-note.

Therefore, by causing the scanning optical system to move the focal position of the laser light in the direction along the observation optical axis by means of the control portion on the basis of the amount by which the region-of-interest is moved in the direction along the observation optical axis, which is calculated by the first amount-of-movement calculating portion, it is possible to observe a moving sample by tracking the sample while the apparent orientation of the region-of-interest in the three-dimensional image and the position thereof in the direction along the observation optical axis are maintained steady in real time.

In the above-described aspect, with respect to rotation of the region-of-interest associated with rotation of the region-of-note about an intersecting axis that intersects the observation optical axis, the amount-of-rotation calculating portion may calculate an amount by which the region-of-interest is rotated about the intersecting axis in the image, and the control portion may cause the scanning optical system to move, while scanning the laser light in a direction that intersects the observation optical axis, the focal position in the direction along the observation optical axis on the basis of the amount by which the region-of-interest is rotated about the intersecting axis, which is calculated by the amount-of-rotation calculating portion.

By employing such a configuration, when the region-of-note in the sample is rotated about the intersecting axis that intersects the observation optical axis, by inclining the surface scanned by the laser light in accordance with the inclination of the region-of-note about the intersecting axis, it is possible to observe the sample by tracking the sample while the apparent orientation of the region-of-interest in the three-dimensional image and the inclination thereof about the intersecting axis are maintained steady in real time.

The above-described aspect may be provided with a scanning-area moving portion that can move the area in which the laser light is scanned, by the scanning optical system, in two-dimensional directions that intersect the observation optical axis; and a second amount-of-movement calculating portion that calculates amounts by which the region-of-interest is moved in the two-dimensional directions in the image in association with the movement of the region-of-note in the two-dimensional directions, wherein the control portion may cause the scanning-area moving portion to move the area in which the laser light is scanned in the two-dimensional directions on the basis of the amounts by which the region-of-interest is moved in the two-dimensional directions, which are calculated by the second amount-of-movement calculating portion.

By employing such a configuration, it is possible to observe, by means of the scanning-area moving portion, different areas in the two-dimensional directions that intersect the observation optical axis. In this case, when the region-of-note in the sample in which the region-of-interest is set is moved in the two-dimensional directions that intersect the observation optical axis, the region-of-interest is moved in the image in association with the movements of the region-of-note.

Therefore, by causing the scanning-area moving portion to move the area in which the laser light is scanned in the two-dimensional directions that intersect the observation optical axis by means of the control portion on the basis of the amounts by which the region-of-interest is moved in the two-dimensional directions that intersect the observation optical axis, which are calculated by the second amount-of-movement calculating portion, it is possible to observe a moving sample by tracking the sample while the position of the region-of-interest in the image in the two-dimensional directions that intersect the observation optical axis is also maintained steady in real time.

The above-described aspect may be provided with an additional scanning optical system that scans the laser light on the sample, wherein the region-of-interest setting portion may set an additional region-of-note, which is an area of note in the sample, so as to serve as an additional region-of-interest in the image, the amount-of-rotation calculating portion may calculate an amount by which the additional region-of-interest is rotated about the observation optical axis in the image in association with rotation of the additional region-of-note about the observation optical axis, and the control portion may control the additional scanning optical system so that the direction in which the laser light is scanned in the additional region-of-note is made steady on the basis of the amount by which the additional region-of-interest is rotated about the observation optical axis, which is calculated by the amount-of-rotation calculating portion.

By employing such a configuration, it is possible to perform light stimulation on the sample by scanning the laser light on the sample by means of the additional scanning optical system. By doing so, it is possible to observe the reaction of the sample subjected to the light stimulation by using the image acquired by means of the observation optical system. In this case, when the additional region-of-note in the sample in which the additional region-of-interest is set is rotated about the observation optical axis, the additional region-of-interest is rotated in the image in association with the rotation of the additional region-of-note.

Therefore, by controlling the additional scanning optical system by means of the control portion on the basis of the amount by which the additional region-of-interest is rotated about the observation optical axis, which is calculated by the amount-of-rotation calculating portion, it is possible to make the direction in which the laser light is scanned in the additional region-of-note in the sample steady. By doing so, it is possible to perform light stimulation on a moving sample by tracking the sample while the apparent orientation of the additional region-of-interest in the image is maintained steady in real time.

The above-described aspect may be provided with an additional focal-position moving portion that can move the focal position of the laser light in a direction along the observation optical axis; and an additional first amount-of-movement calculating portion that calculates an amount by which the additional region-of-interest is moved in the direction along the observation optical axis in the image in association with movement of the additional region-of-note in the direction along the observation optical axis, wherein the control portion may cause the additional focal-position moving portion to move the focal position in the direction along the observation optical axis on the basis of the amount by which the additional region-of-interest is moved in the direction along the observation optical axis, which is calculated by the additional first amount-of-movement calculating portion.

By employing such a configuration, it is possible to perform light stimulation at a three-dimensional position in the sample by moving, by means of the additional focal-position moving portion, the focal position of the laser light in the direction along the observation optical axis with respect to the sample. In this case, when the additional region-of-note in the sample in which the additional region-of-interest is set is rotated about the observation optical axis and moved in the direction along the observation optical axis, the additional region-of-interest is rotated and moved in the image in association with the rotation and the movement of the additional region-of-note.

Therefore, by causing the additional focal-position moving portion to move the focal position in the direction along the observation optical axis by means of the control portion on the basis of the amount by which the additional region-of-interest additional is moved, which is calculated by the first amount-of-movement calculating portion, it is possible to perform light stimulation on a moving sample by tracking the sample while the apparent orientation of the additional region-of-interest in the three-dimensional image and the position thereof in the direction along the observation optical axis are maintained steady in real time.

In the above-described aspect, with respect to rotation of the additional region-of-interest associated with rotation of the additional region-of-note about an intersecting axis that intersects the observation optical axis, the amount-of-rotation calculating portion may calculate an amount by which the additional region-of-interest is rotated about the intersecting axis in the image, and the control portion may cause the additional focal-position moving portion to move, in synchronization with scanning of the laser light by the additional scanning optical system, the focal position in the direction along the observation optical axis on the basis of the amount by which the additional region-of-interest is rotated about the intersecting axis, which is calculated by the amount-of-rotation calculating portion.

By employing such a configuration, when the additional region-of-note in the sample is rotated about the intersecting axis that intersects the observation optical axis, it is possible to incline the surface scanned by the laser light in accordance with the inclination of the additional region-of-note. By doing so, it is possible to perform light stimulation on a moving sample by tracking the sample while the apparent orientation of the additional region-of-interest in the three-dimensional image and the inclination thereof about the intersecting axis are maintained steady in real time.

The above-described aspect may be provided with an additional first amount-of-movement calculating portion that calculates an amount by which the additional region-of-interest is moved in a direction along the observation optical axis in the image in association with the movement of the additional region-of-note in the direction along the observation optical axis, wherein the control portion may cause the additional scanning optical system to move the focal position of the laser light in the direction along the observation optical axis on the basis of the amount by which the additional region-of-interest is moved in the direction along the observation optical axis, which is calculated by the additional first amount-of-movement calculating portion.

By employing such a configuration, it is possible to perform light stimulation at a three-dimensional position in the sample by moving the focal position of the laser light in the direction along the observation optical axis while scanning, by means of the additional scanning optical system, the laser light in the direction that intersects the observation optical axis with respect to the sample. In this case, when the additional region-of-note in the sample in which the additional region-of-interest is set is rotated about the observation optical axis and moved in the direction along the observation optical axis, the additional region-of-interest is rotated and moved in the image in association with the rotation and the movement of the additional region-of-note.

Therefore, by causing the additional scanning optical system to move the focal position of the laser light in the direction along the observation optical axis by means of the control portion on the basis of the amount by which the additional region-of-interest is moved in the direction along the observation optical axis, which is calculated by the additional first amount-of-movement calculating portion, it is possible to perform light stimulation on a moving sample by tracking the sample while the apparent orientation of the additional region-of-interest in the three-dimensional image and the position thereof in the direction along the observation optical axis are maintained steady in real time.

In the above-described aspect, with respect to rotation of the additional region-of-interest associated with rotation of the additional region-of-note about an intersecting axis that intersects the observation optical axis, the amount-of-rotation calculating portion may calculate an amount by which the additional region-of-interest is rotated about the intersecting axis in the image, and the control portion may cause the additional scanning optical system to move, while scanning the laser light by the additional scanning optical system in the direction that intersects the observation optical axis, the focal position in the direction along the observation optical axis on the basis of the amount by which the additional region-of-interest is rotated about the intersecting axis, which is calculated by the amount-of-rotation calculating portion.

By employing such a configuration, when the additional region-of-note in the sample is rotated about the intersecting axis that intersects the observation optical axis, by inclining the surface scanned by the laser light in accordance with the inclination of the additional region-of-note about the intersecting axis, it is possible to perform light stimulation on the sample by tracking the sample while maintaining, in real time, the apparent orientation of the additional region-of-interest in the three-dimensional image and the inclination about the intersecting axis to be steady.

The above-described aspect may be provided with an additional scanning-area moving portion that can move the area in which the laser light is scanned, by the additional scanning optical system, in two-dimensional directions that intersect the observation optical axis; and an additional second amount-of-movement calculating portion that calculates an amount by which the additional region-of-interest is moved in the two-dimensional directions in the image in association with the movement of the additional region-of-note in the two-dimensional directions, wherein the control portion may cause the additional scanning-area moving portion to move, in the two-dimensional directions, the area in which the laser light is scanned on the basis of the amounts by which the additional region-of-interest is moved in the two-dimensional directions, which are calculated by the additional second amount-of-movement calculating portion.

By employing such a configuration, it is possible to perform, by means of the additional scanning-area moving portion, light stimulation in different areas in the two-dimensional directions that intersect the observation optical axis. In this case, when the additional region-of-note in the sample in which the additional region-of-interest is set is moved in the two-dimensional directions that intersect the observation optical axis, the additional region-of-interest is moved in the image in association with the movements of the additional region-of-note.

Therefore, by causing the additional scanning-area moving portion to move the area in which the laser light is scanned in the two-dimensional direction that intersects the observation optical axis by means of the control portion on the basis of the amounts by which the additional region-of-interest is moved in the two-dimensional directions that intersect the observation optical axis, which are calculated by the additional second amount-of-movement calculating portion, it is possible to perform light stimulation on a moving sample by tracking the sample while maintaining, in real time, also the position of the additional region-of-interest in the image in the two-dimensional directions that intersect the observation optical axis to be steady.

REFERENCE SIGNS LIST 1, 41 microscope system
9 electrically driven stage (scanning-area moving portion, additional scanning-area moving portion)
13 galvanometer scanner (scanning optical system)
15 observation optical system
19 ETL (focal-position moving portion)
27 ROI setting portion (region-of-interest setting portion)
29 control portion
30 observation ROI (region-of-interest)
31 amount-of-rotation calculating portion
33 amount-of-movement calculating portion (first amount-of-movement calculating portion, second amount-of-movement calculating portion, additional first amount-of-movement calculating portion, additional second amount-of-movement calculating portion)
40 stimulation ROI (additional region-of-interest)
43 stimulating galvanometer scanner (additional scanning optical system)
S sample
W region-of-note
Z stimulation region (additional region-of-note)

The invention claimed is:

1. A microscope system comprising:
a scanning optical system that scans laser light on a sample;
an observation optical system that acquires an image of the sample on which the laser light is scanned by the scanning optical system;
a region-of-interest setting portion that sets a region-of-note, which is an area of note in the sample, so as to serve as a region-of-interest in the image acquired by the observation optical system;
an amount-of-rotation calculating portion that calculates an amount by which the region-of-interest is rotated about an observation optical axis in the image in association with rotation of the region-of-note about the observation optical axis of the observation optical system; and
a control portion that controls the scanning optical system so that the direction in which the laser light is scanned in the region-of-note is made steady on the basis of the amount by which the region-of-interest is rotated about the observation optical axis, which is calculated by the amount-of-rotation calculating portion.

2. A microscope system according to claim 1, further comprising:
a focal-position moving portion that can move a focal position of the laser light in a direction along the observation optical axis; and
a first amount-of-movement calculating portion that calculates an amount by which the region-of-interest is moved in the direction along the observation optical axis in the image in association with movement of the region-of-note in the direction along the observation optical axis,
wherein the control portion causes the focal-position moving portion to move the focal position in the direction along the observation optical axis on the basis of the amount by which the region-of-interest is moved in the direction along the observation optical axis, which is calculated by the first amount-of-movement calculating portion.

3. A microscope system according to claim 2, wherein, with respect to rotation of the region-of-interest associated with rotation of the region-of-note about an intersecting axis that intersects the observation optical axis, the amount-of-rotation calculating portion calculates an amount by which the region-of-interest is rotated about the intersecting axis in the image, and
the control portion causes the focal-position moving portion to move, in synchronization with scanning of the laser light by the scanning optical system, the focal position in the direction along the observation optical axis on the basis of the amount by which the region-of-interest is rotated about the intersecting axis, which is calculated by the amount-of-rotation calculating portion.

4. A microscope system according to claim 1, further comprising:

a first amount-of-movement calculating portion that calculates an amount by which the region-of-interest is moved in a direction along the observation optical axis in the image in association with the movement of the region-of-note in the direction along the observation optical axis, wherein the control portion causes the scanning optical system to move the focal position of the laser light in the direction along the observation optical axis on the basis of the amount by which the region-of-interest is moved in the direction along the observation optical axis, which is calculated by the first amount-of-movement calculating portion.

5. A microscope system according to claim 4,
wherein, with respect to rotation of the region-of-interest associated with rotation of the region-of-note about an intersecting axis that intersects the observation optical axis, the amount-of-rotation calculating portion calculates an amount by which the region-of-interest is rotated about the intersecting axis in the image, and
the control portion causes the scanning optical system to move, while scanning the laser light in a direction that intersects the observation optical axis, the focal position in the direction along the observation optical axis on the basis of the amount by which the region-of-interest is rotated about the intersecting axis, which is calculated by the amount-of-rotation calculating portion.

6. A microscope system according to claim 1, further comprising:
a scanning-area moving portion that can move the area in which the laser light is scanned, by the scanning optical system, in two-dimensional directions that intersect the observation optical axis; and
a second amount-of-movement calculating portion that calculates amounts by which the region-of-interest is moved in the two-dimensional directions in the image in association with the movement of the region-of-note in the two-dimensional directions,
wherein the control portion causes the scanning-area moving portion to move the area in which the laser light is scanned in the two-dimensional directions on the basis of the amounts by which the region-of-interest is moved in the two-dimensional directions, which are calculated by the second amount-of-movement calculating portion.

7. A microscope system according to claim 1, further comprising:
an additional scanning optical system that scans the laser light on the sample,
wherein the region-of-interest setting portion sets an additional region-of-note, which is an area of note in the sample, so as to serve as an additional region-of-interest in the image,
the amount-of-rotation calculating portion calculates an amount by which the additional region-of-interest is rotated about the observation optical axis in the image in association with rotation of the additional region-of-note about the observation optical axis, and
the control portion controls the additional scanning optical system so that the direction in which the laser light is scanned in the additional region-of-note is made steady on the basis of the amount by which the additional region-of-interest is rotated about the observation optical axis, which is calculated by the amount-of-rotation calculating portion.

8. A microscope system according to claim 7, further comprising:
an additional focal-position moving portion that can move the focal position of the laser light in a direction along the observation optical axis; and
an additional first amount-of-movement calculating portion that calculates an amount by which the additional region-of-interest is moved in the direction along the observation optical axis in the image in association with movement of the additional region-of-note in the direction along the observation optical axis,
wherein the control portion causes the additional focal-position moving portion to move the focal position in the direction along the observation optical axis on the basis of the amount by which the additional region-of-interest is moved in the direction along the observation optical axis, which is calculated by the additional first amount-of-movement calculating portion.

9. A microscope system according to claim 8
wherein, with respect to rotation of the additional region-of-interest associated with rotation of the additional region-of-note about an intersecting axis that intersects the observation optical axis, the amount-of-rotation calculating portion calculates an amount by which the additional region-of-interest is rotated about the intersecting axis in the image, and
the control portion causes the additional focal-position moving portion to move, in synchronization with scanning of the laser light by the additional scanning optical system, the focal position in the direction along the observation optical axis on the basis of the amount by which the additional region-of-interest is rotated about the intersecting axis, which is calculated by the amount-of-rotation calculating portion.

10. A microscope system according to claim 7, further comprising:
an additional first amount-of-movement calculating portion that calculates an amount by which the additional region-of-interest is moved in a direction along the observation optical axis in the image in association with the movement of the additional region-of-note in the direction along the observation optical axis,
wherein the control portion causes the additional scanning optical system to move the focal position of the laser light in the direction along the observation optical axis on the basis of the amount by which the additional region-of-interest is moved in the direction along the observation optical axis, which is calculated by the additional first amount-of-movement calculating portion.

11. A microscope system according to claim 10,
wherein, with respect to rotation of the additional region-of-interest associated with rotation of the additional region-of-note about an intersecting axis that intersects the observation optical axis, the amount-of-rotation calculating portion calculates an amount by which the additional region-of-interest is rotated about the intersecting axis in the image, and
the control portion causes the additional scanning optical system to move, while scanning the laser light by the additional scanning optical system in the direction that intersects the observation optical axis, the focal position in the direction along the observation optical axis on the basis of the amount by which the additional region-of-interest is rotated about the intersecting axis, which is calculated by the amount-of-rotation calculating portion.

12. A microscope system according to claim 7, further comprising:
- an additional scanning-area moving portion that can move the area in which the laser light is scanned, by the additional scanning optical system, in two-dimensional directions that intersect the observation optical axis; and
- an additional second amount-of-movement calculating portion that calculates an amount by which the additional region-of-interest is moved in the two-dimensional directions in the image in association with the movement of the additional region-of-note in the two-dimensional directions,
- wherein the control portion causes the additional scanning-area moving portion to move, in the two-dimensional directions, the area in which the laser light is scanned on the basis of the amounts by which the additional region-of-interest is moved in the two-dimensional directions, which are calculated by the additional second amount-of-movement calculating portion.

* * * * *